(12) United States Patent
Sasaoka et al.

(10) Patent No.: US 7,995,874 B2
(45) Date of Patent: Aug. 9, 2011

(54) OPTICAL FIBER DISTRIBUTION TYPE SENSOR AND OPTICAL FIBER DISTRIBUTION TYPE DETECTING METHOD

(75) Inventors: Eisuke Sasaoka, Yokohama (JP); Yoshinori Yamamoto, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 312 days.

(21) Appl. No.: 12/443,113

(22) PCT Filed: Sep. 19, 2007

(86) PCT No.: PCT/JP2007/068160
§ 371 (c)(1),
(2), (4) Date: Mar. 26, 2009

(87) PCT Pub. No.: WO2008/050557
PCT Pub. Date: May 2, 2008

(65) Prior Publication Data
US 2010/0092127 A1 Apr. 15, 2010

(30) Foreign Application Priority Data
Sep. 26, 2006 (JP) ................................ 2006-261045

(51) Int. Cl.
*G02B 6/00* (2006.01)
*G01N 21/00* (2006.01)
(52) U.S. Cl. ........................................ 385/12; 356/73.1
(58) Field of Classification Search .................. None
See application file for complete search history.

(56) References Cited

U.S. PATENT DOCUMENTS 6,817,257 B2 * 11/2004 Kluth et al. ................. 73/866.5
7,576,840 B2 * 8/2009 Yamamoto ................. 356/35.5

FOREIGN PATENT DOCUMENTS

| JP | 4-307328 | 10/1992 |
| JP | 2000-180265 | 6/2000 |
| JP | 2003-156315 | 5/2003 |

OTHER PUBLICATIONS

Hotate et al., "Simplified System of Fiber Brillouin Optical Correlation Domain Analysis for Distributed Strain Sensing", OFS-16, pp. 290-293 (Oct. 2003).

* cited by examiner

*Primary Examiner* — Uyen-Chau N Le
*Assistant Examiner* — Chris H Chu
(74) *Attorney, Agent, or Firm* — Venable LLP; Michael A. Sartori (57) ABSTRACT

The present invention relates to an optical fiber distribution type detecting method and the like equipped with a structure for enabling efficient measurement of a temperature distribution or strain distribution. This method regulates a modulation frequency and modulation index for probe light and pumping light opposingly incident on an object from a light source and a phase difference between the probe light and pumping light, thereby successively setting the length and location of search domains in a region to be measured. In particular, a detection process is executed while resetting the search domain length shorter at a predetermined interval of time or when an abnormality is detected. Thus partly changing the distance resolution for a specific region in the course of the detection process enables efficient measurement operations in a short time.

7 Claims, 7 Drawing Sheets

OPTICAL FIBER DISTRIBUTION TYPE SENSOR AND OPTICAL FIBER DISTRIBUTION TYPE DETECTING METHOD

TECHNICAL FIELD

The present invention relates to an optical fiber distribution type sensor and an optical fiber distribution type detecting method which detect changes in temperature or strain of an optical fiber by utilizing Brillouin scattered light outputted from the optical fiber.

BACKGROUND ART

The form of a Brillouin gain spectrum (hereinafter referred to as BGS) of Brillouin scattered light outputted from an optical fiber changes depending on the temperature and strain of the optical fiber. There is a technique which measures the temperature and strain by utilizing this change.

Known as an example of the technique for measuring the BGS of Brillouin scattered light is BOCDA (Brillouin Optical Correlation Domain Analysis) (see Nonpatent Document 1). In the BOCDA, probe light and pumping light modulated with the same modulation frequency and modulation index are made incident on an optical fiber opposingly from different end parts thereof. Here, while sweeping the difference (hereinafter referred to as optical frequency difference) between the respective center frequencies of probe light and pumping light, the BOCDA measures the BGS of Brillouin scattered light occurring in a place exhibiting a correlation peak.

The BGS occurs in a search domain depending on the modulation frequency and modulation index of the probe light and pumping light. The location of the search domain depends on the phase difference between the probe light and pumping light.

Non-patent Document: Kazuo HOTATE, et al., "Simplified System of Fiber Brillouin Optical Correlation Domain Analysis for Distributed Strain Sensing", 16th International Conference on Optical Fiber Sensors (OFS-16), We2-3, p. 290-293, October 2003.

DISCLOSURE OF THE INVENTION

Problems that the Invention is to Solve

The inventors have studied the conventional BOCDA and, as a result, have found problems as follows. Namely, the conventional BOCDA measures a temperature distribution or strain distribution with a high accuracy by minimizing the width (domain length) of the search domain for generating the BGS (densely taking measurement points along the longitudinal direction of the optical fiber). However, this has been problematic in that, since the number of measurement points increases, the measurement time becomes longer, thereby lowering the efficiency in measurement.

The present invention is made to solve the aforementioned problem, and it is an object to provide an optical fiber distribution type sensor and optical fiber distribution type detecting method equipped with a structure for enabling efficient measurement of the temperature distribution or strain distribution.

Means for Solving the Problems

The optical fiber distribution type detecting method according to the present invention detects an amount of physical change at a specific location of an object, by measuring Brillouin scattered light outputted from an optical fiber at least part of which is placed as a sensor section in the object.

In particular, the optical fiber distribution type detecting method according to the present invention comprises a control step, a measurement step, and a detection step.

The control step is a step of allocating at least one search domain as a detecting subject to at least part of a region to be measured in the optical fiber placed in the object before supplying the optical fiber with probe light and pumping light modulated with the same modulation frequency and modulation index in a state maintaining a predetermined phase difference therebetween. Therefore, there is a case where a part of the region to be measured in the optical fiber acting as a sensor section is excluded from the object to be measured. Further, the control step includes a domain control substep and a location control substep. The domain control substep determines a length of the search domain by regulating the modulation frequency and modulation index. The location control substep determines a location of the search domain by regulating the phase difference between the probe light and pumping light.

The measurement step is a step of receiving, as output light from the search domain specified as the detecting subject by the control step, probe light having acquired a gain by Brillouin scattered light occurring as the probe light and pumping light propagate through the specified search domain, and measuring data related to a form of a BGS which is a spectrum of the gain acquired by the received probe light. The probe light and pumping light modulated with the same modulation frequency and modulation index in the state maintaining a predetermined phase difference therebetween are made incident on the optical fiber opposingly from different end parts thereof. The "data related to a form of a BGS" refers to data related to specific forms of spectra such as parameters including peak center frequencies characterizing the form of BGS, other numerical values representing peak forms (e.g., value of inclination of a gain-decreasing part from the center frequency), and the center frequency difference between two peaks.

The detection step detects a temperature change or strain change of the optical fiber in the specified search domain in accordance with the data related to the form of Brillouin gain spectrum of the received probe light measured in the measurement step.

In particular, the optical fiber distribution type detecting method according to the present invention repeats the measurement step and detection step a plurality of times as a detection process progresses. The repeating timing is at a fixed interval of time, for example. In this case, one search domain can be measured intensively (without changing the length or location of the search domain during the measurement). The measurement step and detection step may be performed repeatedly every time at least one of incidents of changing the length of the search domain in the domain control substep and changing the location of the search domain in the location control substep occurs. Here, "changing the length of the search domain" encompasses both of the settings for elongating and shortening the search domain.

In the optical fiber distribution type detecting method according to the present invention, the location control substep determines a search domain location at a fixed interval of time or every time the measurement step and detection step concerning the specific search domain end. In this case, the location of the search domain to be specified may be unchanged or successively changed to adjacent search domains.

In the optical fiber distribution type detecting method according to the present invention, the domain control substep determines a search domain length at a fixed interval of time or every time the measurement step and detection step concerning the specific search domain end. In this case, the search domain may be set longer (when changing the domain from a shorter search domain to an adjacent longer search domain), unchanged in terms of length (when search domains having the same length are allocated in series), or set shorter (when changing the domain from a longer search domain to an adjacent shorter search domain). This is because, in a state where a plurality of search domains are allocated in a region to be measured in an optical fiber, adjacent search domains may have lengths different from each other, thereby making it necessary to change their respective search domain lengths in the domain control substep.

Further, in the optical fiber distribution type detecting method according to the present invention, the domain control substep may change the search domain length such that at least the search domain specified as the detecting subject is divided into a plurality of smaller search domains when an occurrence of a temperature change or strain change in the specified search domain is detected in the detection step.

As in the foregoing, the optical fiber distribution type detecting method according to the present invention can improve the measurement efficiency by setting the search domain length relatively long until a temperature change or strain change is occurred in the region to be measured in the optical fiber acting as the sensor section. When a temperature change or strain change is occurred in any search domain, the length of the search domain where the temperature change or strain change is occurred is set shorter, whereby the measurement can be effected with a favorable accuracy. Thus partly changing the distance resolution in a partial area in the region to be measured (dividing a search domain where a temperature change or strain change can be detected into smaller search domains and detecting them) as the detection process progresses can efficiently measure the temperature distribution or strain distribution.

In the optical fiber distribution type detecting method according to the present invention, the domain control substep may set, as an initial setting, a search domain length coinciding with the whole region to be measured in the optical fiber. Specifically, the search domain length for measuring the BGS is set to such a length that the whole region to be measured can be measured in the first detection process, and a search domain having a different length is set only in a specific area in a later detection process.

This structure enables a detection process with a high distance resolution (measurement of data concerning the form of BGS from each of search domains set smaller) only in a necessary area. Namely, the accuracy in the temperature distribution measurement or strain distribution measurement can appropriately be improved.

This optical fiber distribution type sensor according to the present invention is equipped with a structure for executing the above-mentioned optical fiber distribution type detecting method (the optical fiber distribution type detecting method according to the present invention). Specifically, the optical fiber distribution type sensor comprises a light source, an optical fiber as a sensor section, a spectrum measurement section, a detection section, and a control section.

The light source outputs probe light and pumping light modulated with the same modulation frequency and modulation index in a state maintaining a predetermined phase difference therebetween. The optical fiber is at least partly placed in an object and outputs Brillouin scattered light occurring as the probe light and pumping light outputted from the light source propagate. Here, the probe light and pumping light from the light source are made incident on the optical fiber from different end parts thereof. The spectrum measurement section receives probe light having acquired a gain by the Brillouin scattered light, and measures data related to a form of a Brillouin gain spectrum which is a spectrum of the gain acquired by the received probe light. The detection section detects, in accordance with the data related to the form of the Brillouin gain spectrum measured by the spectrum measurement section, an occurrence of a temperature change or strain change in a search domain. The control section controls and drives the light source such as to allocate at least one search domain as a detecting subject to at least part of a region to be measured in the optical fiber placed in the object.

Preferably, in the optical fiber distribution type sensor according to the present invention, the control section includes a domain control section for determining a search domain length by regulating the modulation frequency and modulation index and a location control section for determining a search domain location by regulating the phase difference between the probe light and pumping light.

As explained in the foregoing, the optical fiber distribution type sensor according to the present invention can also improve the measurement efficiency by setting the search domain length relatively long until a temperature change or strain change occurs in the region to be measured in the optical fiber acting as the sensor section. When a temperature change or strain change is generated in any search domain, the length of the search domain where the temperature change or strain change occurs is set shorter, whereby the measurement can be effected with a favorable accuracy. Thus limitedly changing the distance resolution in a partial area in the region to be measured (dividing a search domain where a temperature change or strain change can be detected into smaller search domains and detecting them) as the detection process progresses can efficiently measure the temperature distribution or strain distribution.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

Effects of the Invention

The present invention makes it possible to measure a temperature distribution or strain distribution more efficiently.

DESCRIPTION OF THE REFERENCE NUMERALS

1 ... optical fiber distribution type sensor; 11 ... optical fiber; 12 ... location control section (control section); 13 ... domain control section (control section); 14 ... light source; 18 ... spectrum measurement section; and 19 ... detection section.

BEST MODES FOR CARRYING OUT THE INVENTION

In the following, embodiments of the optical fiber distribution type sensor and optical fiber distribution type detecting method according to the present invention will be explained in detail with reference to FIGS. 1 to 7. In the explanation of the drawings, the same parts and constituents will be referred to with the same numerals while omitting their overlapping descriptions.

Figure 1:
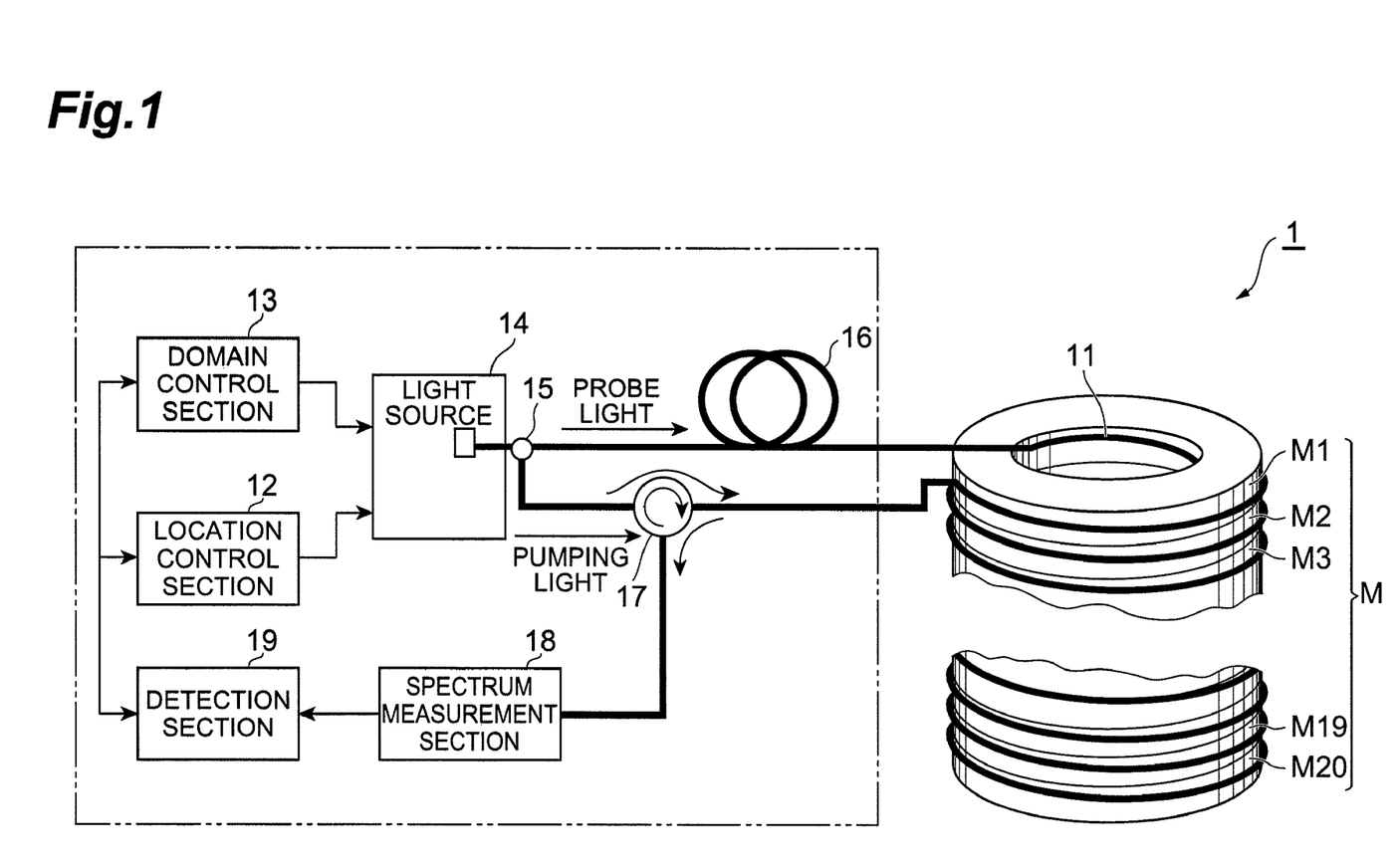
FIG. 1 is a view showing the structure of an embodiment of the optical fiber distribution type sensor according to the present invention.

FIG. 1 is a view showing the structure of an embodiment of the optical fiber distribution type sensor according to the present invention. The optical fiber distribution type sensor 1 is an apparatus which receives probe light having acquired a gain by Brillouin scattered light outputted from an optical fiber 11 placed in such a state that a part thereof is in contact with an object to be measured M, and measures a temperature distribution or strain distribution of the object to be measured M in accordance with data related to a form of a BGS of the received probe light.

The Brillouin scattered light is scattered light down-converted to a direction opposite from the advancing direction of pumping light by a interaction between the pumping light fed into an optical fiber and an acoustic wave generated in the optical fiber by the pumping light. The BGS is a gain spectrum of the probe light having acquired a gain by the Brillouin scattered light.

Figure 2:
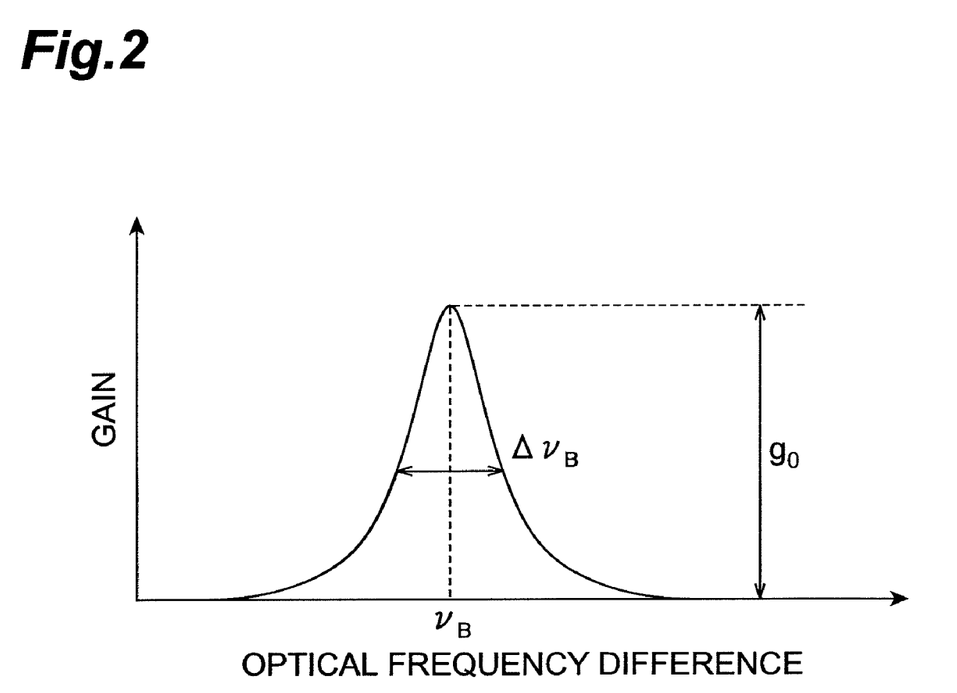
FIG. 2 is a graph showing a BGS.

FIG. 2 is a graph showing the BGS. As shown in FIG. 2, letting ν be the optical frequency difference between the probe light and pumping light, the BGS is expressed by the Lorenz function of the following expression (1):

$$g_B(\nu) = \frac{g_0}{1 + \{2(\nu - \nu_B)/\Delta\nu_B\}^2} \quad (1)$$

In expression (1), $g_0$ is the maximum gain, $\nu_B$ is the center frequency, and $\Delta\nu_B$ is the line width (full width at half maximum). The maximum gain $g_0$, center frequency $\nu_B$, and line width $\Delta\nu_B$ are parameters characterizing the BGS. These parameters vary depending on the temperature or strain at an occurred location where the Brillouin scattered light is generated in the optical fiber.

The "data related to a form of a BGS" refers to data related to specific forms of spectra such as parameters characterizing the form of BGS, other numerical values representing peak forms (e.g., value of inclination of a gain-decreasing part from the center frequency), and the center frequency difference between two peaks. This embodiment utilizes the center frequency of a peak as data related to the form of BGS.

The Brillouin scattered light occurs at a location showing a correlation peak between the probe light and pumping light opposingly incident on the optical fiber. The Brillouin scattered light occurs within a domain having a width depending on the modulation frequency and modulation index for frequency modulation of the probe light and pumping light. The length of the domain (search domain) generating the BGS is represented by the following expression (2):

$$\delta_Z = \frac{v_g \Delta\nu_B}{2\pi m \nu_m^2} \quad (2)$$

In expression (2), $v_g$ is the group velocity of the probe light and pumping light, m is the modulation index, and $\nu_m$ is the modulation frequency. The location of the search domain depends on the phase difference between the probe light and pumping light.

The optical fiber distribution type sensor 1 measures the BGS generated in each search domain and, in accordance with the change in the BGS, detects a temperature change or strain change in the search domain where the BGS is generated (detecting process). As such a detecting process is performed while changing the search domain location, a temperature distribution or strain distribution can be measured along the optical fiber 11.

In this embodiment, the object to be measured M is a superconducting coil of a superconducting motor. For keeping the superconducting coil in a superconducting state, it is necessary to maintain the temperature of the superconducting material at a predetermined temperature or lower. A current which can be caused to flow through a superconducting material depends on the temperature of the superconducting material. For these reasons, it is important to measure a temperature distribution of the superconducting coil.

Figure 3:
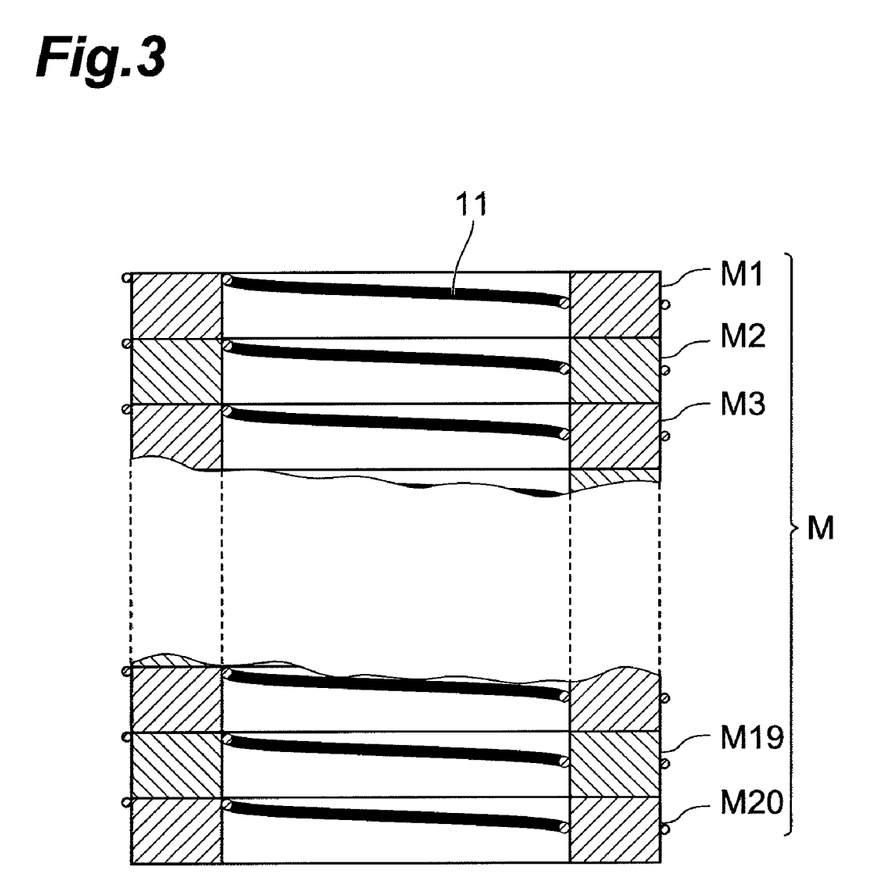
FIG. 3 is a view showing a cross-sectional structure of an object to be measured in which a part (sensor section) of an optical fiber in the optical fiber distribution type sensor shown in FIG. 1 is placed.

In this embodiment, the superconducting coil that is the object to be measured M is formed by winding a superconducting material like reels. Specifically, the superconducting coil is formed like a hollow cylinder by stacking 20 reels M1 to M20 each formed like a ring having an inner circumference of 0.5 m and an outer circumference of 1.0 m. FIG. 3 is a view showing a cross-sectional structure of the object to be measured M (superconducting coil) in which a part (sensor section) of the optical fiber in the optical fiber distribution type sensor shown in FIG. 1 is placed.

Figure 4:
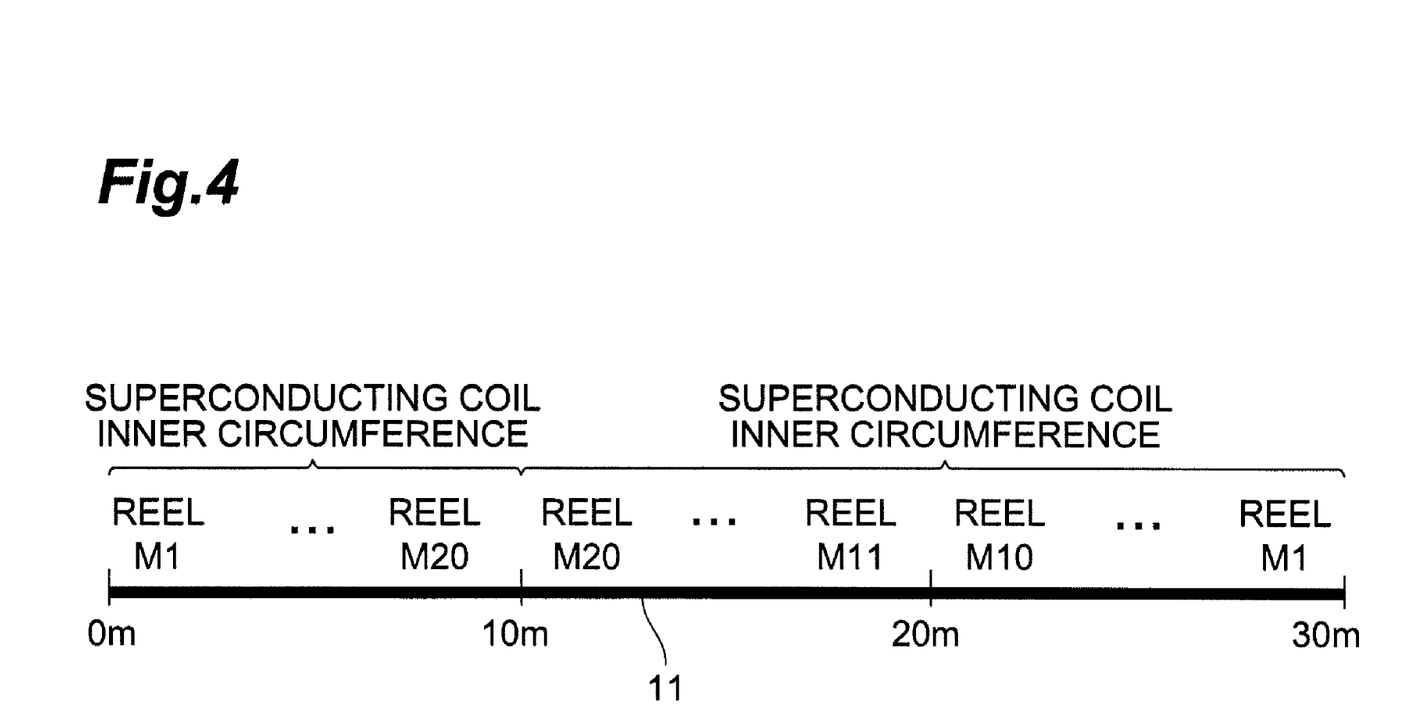
FIG. 4 is a view for explaining the positional relationship between the optical fiber acting as the sensor section and the object to be measured.

As shown in FIGS. 1 and 3, the optical fiber 11 is spirally wound along the inner and outer side faces of the object to be measured M. Namely, the optical fiber 11 is placed such as to be wound once about each of the inner and outer side surfaces of the reels M1 to M20. FIG. 4 is a view for explaining the positional relationship between the optical fiber acting as the sensor section and the object to be measured M. Namely, FIG. 4 shows the region (region to be measured) from the start point to end point of the optical fiber 11 in contact with the object to be measured M in association with individual parts of the object to be measured M in contact with the region to be measured in the optical fiber 11.

As shown in FIG. 4, a region of the optical fiber 11 (hereinafter referred to as fiber region) from 0 m (start point) to 10 m is in contact with the inner circumference surfaces of the reels M1 to M20 so as to correspond to the respective reels by a length of 0.5 m each. Its subsequent fiber region of 10 m to 20 m is in contact with the outer circumference surfaces of the reels M20 to M11 so as to correspond to the respective reels by a length of 1.0 m each. Its subsequent fiber region of 20 m to 30 m (end point) is in contact with the outer circumference surfaces of the reels M10 to M1 so as to correspond to the respective reels by a length of 1.0 m each. The part connecting the inner circumference surface to the outer circumference surface of the reel M20 in the optical fiber 11 is omitted in FIG. 4.

With reference to FIG. 1, the structure of the optical fiber distribution type sensor 1 will now be explained in detail. The optical fiber distribution type sensor 1 comprises the optical fiber 11 partly placed in the object to be measured M as mentioned above, a location control section 12, a domain control section 13, a light source 14, an optical splitter 15, an optical delay 16, a circulator 17, a spectrum measurement section 18, and a detection section 19. Here, the location control section 12 and domain control section 13 constitute a control section of the optical fiber distribution type sensor 1, and this control section executes a control step for allocating at least one search domain as a detecting subject to the region to be measured in the optical fiber 11 placed in the object to be measured M.

By regulating the phase difference between probe light and pumping light outputted from the light source 14, the location control section 12 sets the location of a search domain generating a BGS in the optical fiber 11 (location control substep). The phase difference control is executed when the location control section 12 outputs a phase indication value indicating the phase difference between the probe light and pumping light to the light source 14. The phase indication value may be a phase difference or a phase of one light if the other light has a fixed phase.

The location control section 12 typically sets the phase indication value such as to generate a BGS in each search domain along the longitudinal direction of the optical fiber 11 on the object to be measured M. When the occurrence of a temperature change or strain change is detected by the detection section 19, the location control section 12 regulates the phase difference such as to generate the BGS in each search domain newly set along the longitudinal direction of the optical fiber 11 in the detected region (fiber region corresponding to the detected search domain).

The domain control section 13 regulates the modulation frequency and modulation index by which the light source 14 modulates the probe light and pumping light, thereby setting the length of the search domain generating the BGS (domain control substep). The regulation of the modulation frequency and modulation index is executed when the domain control section 13 outputs a modulation indication value indicative of the modulation frequency and modulation index to the light source 14.

The domain control section 13 regulates the modulation frequency and modulation index such that, when the occurrence of a temperature change or strain change is detected by the detection section 19, the search domain length is made shorter in the detected region as a fiber region corresponding to the detected search domain (the detected search domain is divided into smaller domains). For example, the domain control section 13 typically sets the modulation indication value such that the search domain length is 10 m. When the detection section 19 detects a temperature change, the domain control section 13 resets the modulation indication value such that the search domain length for the detected fiber region is 1 m, and outputs a measurement start order to the spectrum measurement section 18 so as to measure data related to the BGS form again. Further, when a temperature change is detected by the detection section 19, the domain control section 13 sets the modulation indication value such that the search domain length becomes 0.5 m in the detected region, and outputs a measurement start order to the spectrum measurement section 18 so as to measure data related to the BGS form again.

The light source 14 outputs probe light and pumping light which are modulated by the same modulation frequency and modulation index in accordance with the modulation indication value outputted from the location control section 12 and have a phase difference therebetween set in accordance with the phase indication value outputted from the domain control section 13. Here, the light source 14 outputs the probe light and pumping light while sweeping their optical frequency difference.

For example, the light source 14 alternately outputs the probe light and pumping light with a period of about 100 μs. The light source 14 modulates the probe light and pumping light with the same modulation frequency and frequency index, while setting their phase difference. At the same time, the light source 14 shifts the center frequency of the pumping light within the range of 10 to 11 GHz with respect to the center frequency of the probe light, thereby sweeping the optical frequency difference between the probe light and pumping light within the range of 10 to 11 GHz.

The optical splitter 15 splits the output light from the light source 14 into the probe light and pumping light.

The optical delay 16 is constituted by an optical fiber having a length of about 10 km, and imparts a delay of about 50 μs to the probe light separated by the optical splitter 15. Thus imparting a delay to the probe light allows the probe light and pumping light alternately outputted from the light source 14 with a period of 100 μs to have timings coinciding with each other.

The optical fiber 11 has one end connected to the optical delay 16, and the probe light outputted from the optical delay 16 is fed into the optical fiber 11 through this end. On the other hand, the pumping light separated by the optical splitter 15 is fed into the optical fiber 11 from the other end thereof. As the opposingly incident probe light and pumping light propagate, Brillouin scattered light is generated in the optical fiber 11 at a location depending on the phase difference (the generated Brillouin scattered light is outputted from the optical fiber 11).

The spectrum measurement section 18 receives the probe light, outputted from the optical fiber 11 through the circulator 17, having acquired a gain by the Brillouin scattered light, and measures data related to the BGS form of thus received probe light. Namely, the spectrum measurement section 18 measures data related to the BGS form of the probe light having acquired a gain by the Brillouin scattered light occurring in each region in contact with the object to be measured M in the optical fiber 11. The spectrum measurement section 18 outputs data representing the BGS form to the detection section 19. Parameters characterizing the BGS form as measurement data include the center frequency of BGS and the like as mentioned above.

In accordance with the measurement data outputted from the spectrum measurement section 18, the detection section 19 detects the location of the search domain where the temperature change or domain change is generated in the optical fiber 11. The detection section 19 stores data related to the BGS form in a state with a normal temperature or normal strain beforehand. By comparing the stored reference data related to the BGS form and the measurement data outputted from the spectrum measurement section 18 with each other, the detection section 19 detects a change.

When the change in the BGS form is detected, the detection section 19 refers to the modulation indication value and phase indication value outputted by the domain control section 13 and location control section 12, and specifies the search domain where the BGS is generated. Then, a signal indicating the specified domain location is outputted to the location control section 12 and domain control section 13. In response to this signal, the location control section 12 and domain control section 13 reset the length and location of the search domain generating the BGS.

Figure 5:
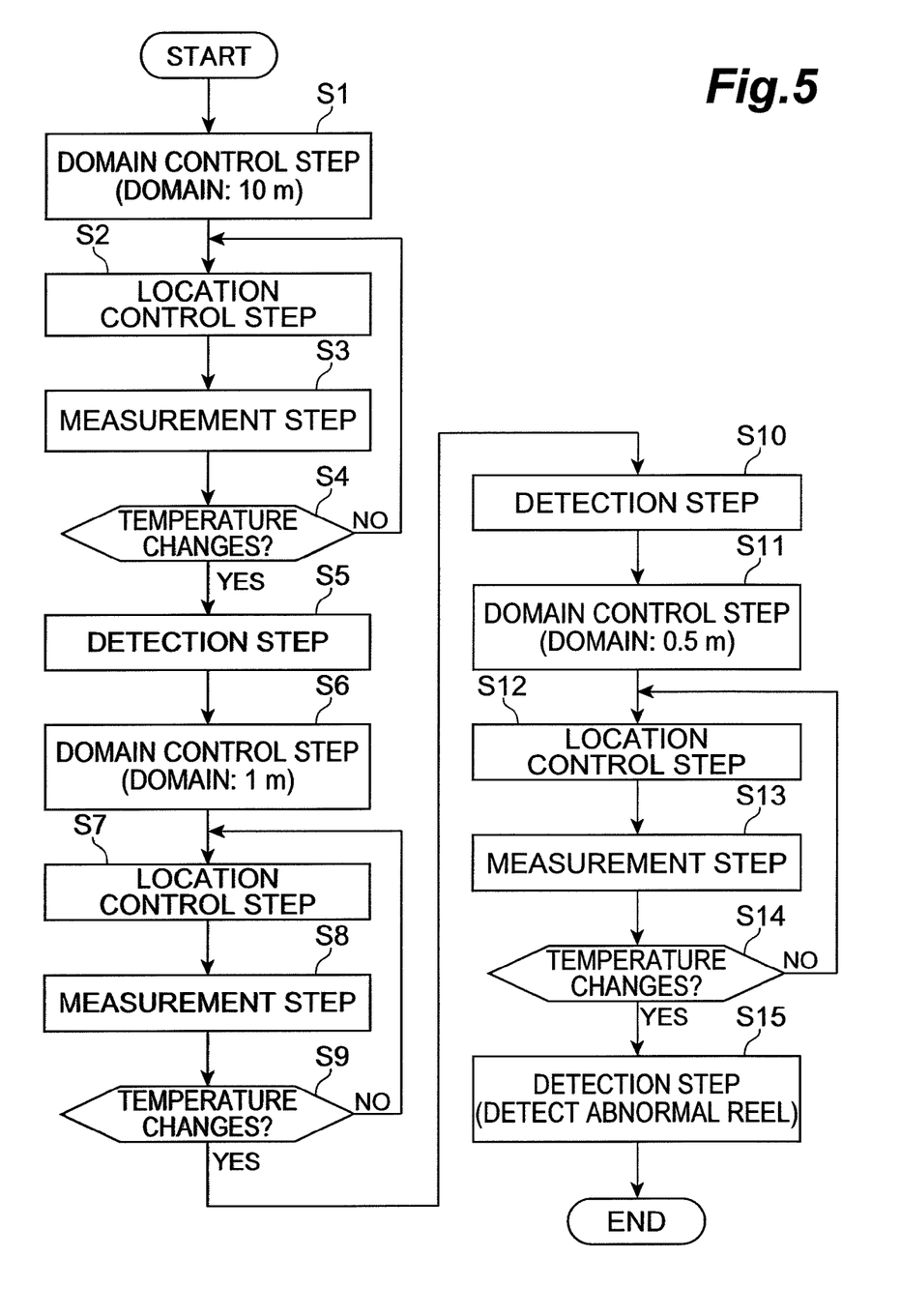
FIG. 5 is a flowchart for explaining operations of an embodiment of the optical fiber distribution type sensor according to the present invention.
Figure 6:
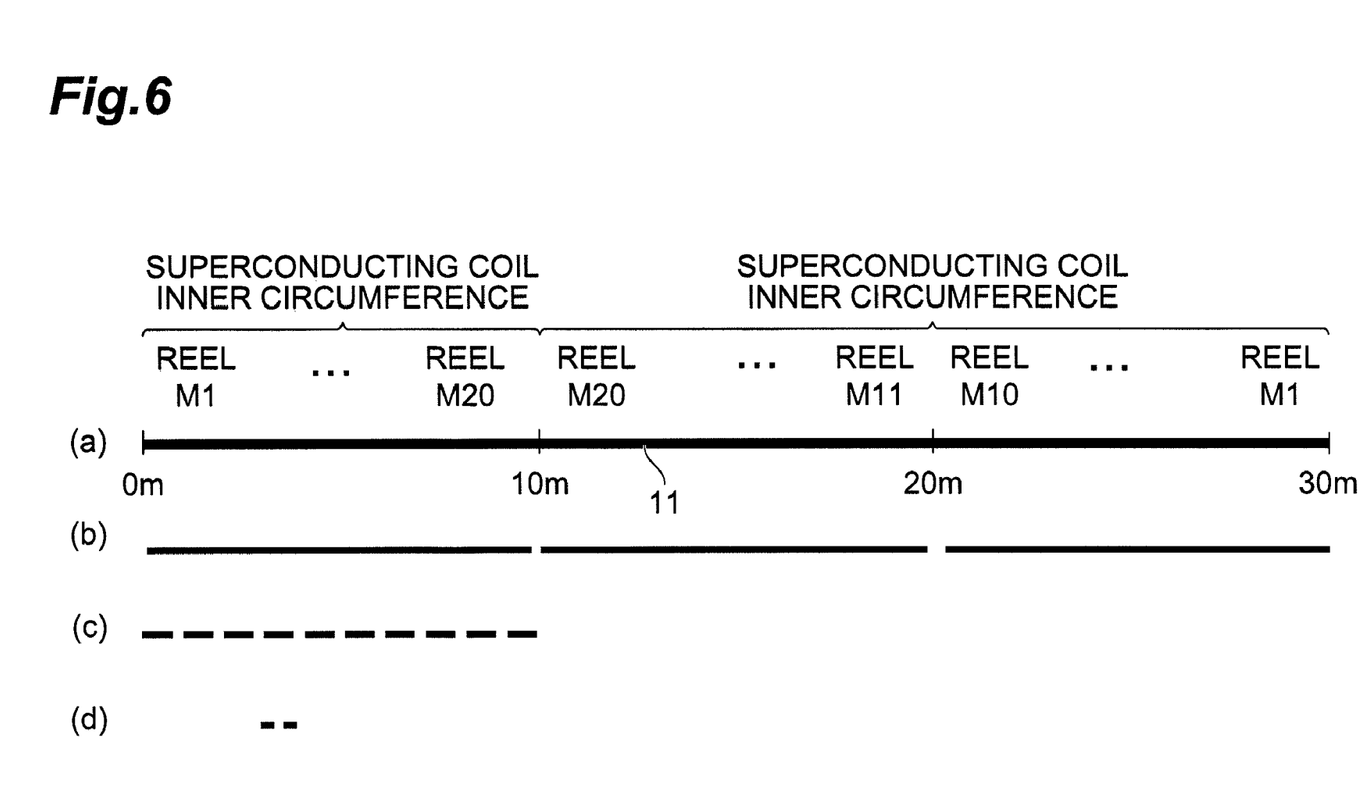
FIG. 6 is a view for explaining one setting example of search domains generating Brillouin scattered light (setting pattern example of search domains changing as the detecting process progresses) in an embodiment of the optical fiber distribution type sensor according to the present invention.

Operations of the optical fiber distribution type sensor 1 will now be explained with reference to FIGS. 5 and 6. A case where an abnormality occurs on the inside of the reel M8 and raises temperature will be explained by way of example. FIG. 5 is a flowchart for explaining the optical fiber distribution type sensor 1. FIG. 6 is a view for explaining one setting example of search domains generating Brillouin scattered light (setting pattern example of search domains changing as the detecting process progresses) in the optical fiber distribution type sensor 1. In similar to FIG. 4, the area (a) of FIG. 6 shows the region (region to be measured) from the start point to end point of the optical fiber 11 in contact with the object to be measured M in association with individual parts of the object to be measured M in contact with the object to be measured in the optical fiber 11.

First, the domain control section 13 outputs a modulation indication value, so that the search domain length for generating the BGS is set to about 10 m as an initial value (step S1). When the search domain length generating the BGS is set to the initial value, the location control section 12 outputs a phase indication value, so that search domains (detection domains) generating the BGS are set as in setting pattern (b) of FIG. 6 (step S2). The search domain length is set to about 10 mm as an initial value, whereby regions to be measured in the optical fiber 11 are allocated to search domains of 0 to 10 m, 10 m to 20 m, and 20 m to 30 m, respectively (control step).

When the search domains are set, the light source 14 outputs probe light and pumping light which are modulated in accordance with a modulation indication value and have a phase difference therebetween set in accordance with a phase indication value, while sweeping their optical frequency difference. Thus outputted probe light and pumping light are opposingly made incident on the optical fiber 11, and Brillouin scattered light occurring in the optical fiber 11 is outputted from the optical fiber 11. The Brillouin scattered light having acquired a gain by the Brillouin scattered light is received by the spectrum measurement section 18, so that its BGS is measured (step S3).

When the BGS is measured, whether there is a temperature change or not is determined in accordance with a measurement result of whether or not there is a change in the BGS form in each search domain. When there is no temperature change (NO in step S4), the flow returns to step S2, whereby measurement is performed in another search domain. Thus, the BGS is successively measured in the search domains (setting pattern (b) in FIG. 6) set along the longitudinal direction of the optical fiber 11 in the state where the search domain length is about 10 m until a temperature change occurs.

When there is a temperature change (YES in step S4), the search domain is recognized as an abnormality generated domain (step S5). When a temperature change is detected in the search domain of 0 to 10 m, for example, the domain control section 13 outputs a modulation indication value, so that the detected search domain is reset to search domains each having a length of about 1 m (step S6). When the search domain length is set shorter, the location control section 12 outputs a phase indication value, so that search domains generating the BGS are successively set as in setting pattern (c) in FIG. 6 (step S7). When the search domain length is set to about 1 m, for example, the BGS is successively measured in the search domains of 0 to 1.0 m, 1.0 to 2.0 m, . . . , and 9.0 to 10.0 m.

When the search domain is reset, the BGS is measured (step S8) as in step S3. When the BGS is measured, whether there is a temperature change or not is determined in accordance with a measurement result of whether or not there is a change in the BGS form at a measurement location. When there is no temperature change (NO in step S9), the flow returns to step S7, whereby the BGS in another search domain is measured. Thus, the BGS is successively measured in the search domains (setting pattern (c) in FIG. 6) set along the longitudinal direction of the optical fiber 11 in the state where the search domain length is about 1 m until a temperature change occurs.

When there is a temperature change (YES in step S9), the search domain is recognized as an abnormality generated domain (step S10). When a temperature change is detected in the search domain of 3.0 to 4.0 m, for example, the domain control section 13 outputs a modulation indication value, so that the detected search domain is reset to search domains each having a length of about 0.5 m (step S11). When the search domain length is set shorter, the location control section 12 outputs a phase indication value, so that search domains generating the BGS are reset as in setting pattern (d) in FIG. 6 (step S12). When the search domain length is set to about 0.5 m, for example, the BGS is successively measured in the search domains of 3.0 to 3.5 m and 3.5 to 4.0 m.

When the search domain is reset, the BGS is measured (step S13) as in step S3. When the BGS is measured, whether there is a temperature change or not is determined in accordance with a measurement result of whether or not there is a change in the BGS of the search domain. When there is no temperature change (NO in step S14), the flow returns to step S7, whereby the BGS in another search domain is measured. Thus, the BGS is successively measured in the search domains (setting pattern (d) in FIG. 6) set along the longitudinal direction of the optical fiber 11 in the state where the search domain length is about 0.5 m until a temperature change is detected.

When there is a temperature change (YES in step S14), the search domain is detected (step S15). The foregoing operations detect a location at which a temperature change occurs on the inside of the reel M8 if any.

When the length of one search domain is 10 m, for example, the measurement time of one search domain is about 0.1 sec, whereby the total measurement time of the above-mentioned three search domains is about 0.3 sec. When the fiber region of 0 to 10 m is divided into search domains each having a length of 1 m, the total measurement time is about 1.0 sec. When the fiber region of 3.0 to 4.0 m is divided into search domains each having a length of 0.5 m, the total measurement time is about 0.2 sec.

The optical fiber distribution type sensor 1 can improve the measurement efficiency by setting the search domain length relatively long until a temperature change or strain change is occurred in a region (region to be measured) in contact with the object to be measured M in the optical fiber 11. When a temperature change or strain change is occurred in a region in contact with the object to be measured M in the optical fiber 11, the measurement accuracy can be improved by setting the search domain length relatively short in the region where the temperature change or strain change is occurred (region corresponding to the detected search domain).

Figure 7:
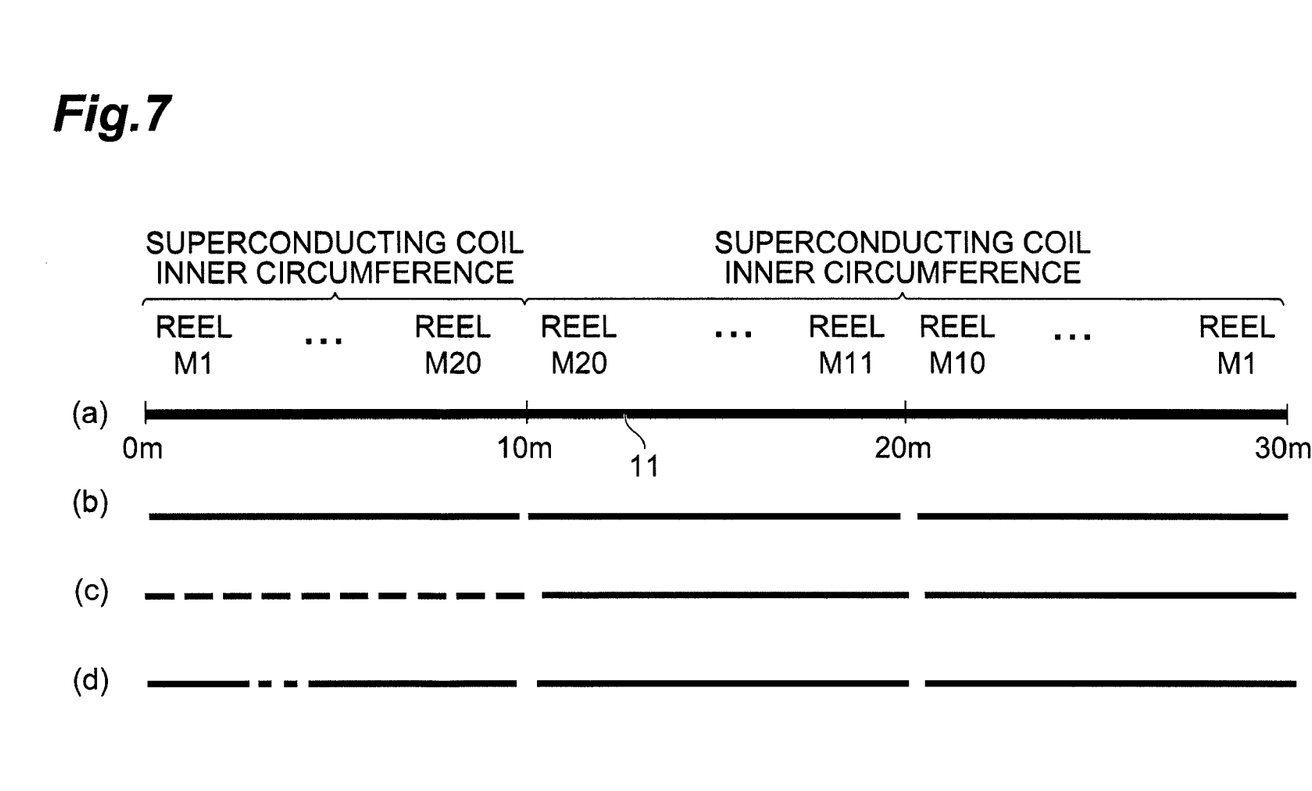
FIG. 7 is a view for explaining another setting example of search domains generating Brillouin scattered light (setting pattern example of search domains changing as the detecting process progresses) in an embodiment of the optical fiber distribution type sensor according to the present invention.

Without being restricted to the above-mentioned embodiment, the present invention can be modified in various ways. For example, when a temperature change is detected, the above-mentioned embodiment more specifically measures only the search domain where the temperature change or strain change is occurred, and does not further measure the other search domains. However, when a temperature change is detected, while dividing the search domain where the temperature change is occurred into smaller domains and measuring them, the remaining search domains may still be measured with the search domain length being fixed to the initial value. FIG. 7 is a view for explaining another setting example of search domains generating Brillouin scattered light (setting pattern example of search domains changing as the detecting process progresses) in the optical fiber distribution type sensor 1.

First, in this case, three search domains each having a length of about 10 m (setting pattern (b) in FIG. 7) are successively measured as in the above-mentioned embodiment (setting pattern (b) in FIG. 6). When a temperature change is detected in the search domain of 0 to 10 m, this search domain is divided into search domains each having a length of about 1 m, and the BGS is measured in each of the divided search domains. On the other hand, the BGS is measured in the search domains of 10 to 20 m and 20 to 30 m (setting pattern (e) of FIG. 7) as in the previous session without changing the length (while keeping the length of 10 m). When an abnormality is detected in the search domain of 3.0 to 4.0 m thereafter, only this domain is divided into search domains each having a length of 0.5 m, and the respective BGS of the divided search domains each having a length of 0.5 m are measured. The BGS is still measured in the other search domains while keeping the search domain length of about 1 m (setting pattern (f) of FIG. 7). Thus, the efficiency in temperature distribution measurement can be improved. When the BGS is measured while setting a further smaller search domain length, in which part of the inner circumference part of the reel M8 the temperature rises can be detected.

Though one superconducting coil is an object to be measured in the above-mentioned embodiment, the number of objects to be measured is not limited to 1, whereby the optical fiber distribution type detecting method according to the present invention is also effective when measuring temperatures of a plurality of superconducting coils with a single optical fiber, for example. The object whose temperature is to be measured is not limited to the superconducting coil. Further, the present invention is applicable to strains without limiting its measurable physical quantities to temperatures.

Though the domain control section 13 sets the search domain length shorter when the detection section 29 detects the occurrence of a temperature change or strain change in the above-mentioned embodiment, this is not restrictive. The search domain length may be set to a predetermined length by which the whole region on the object to be measured M can be measured in the first BGS measurement and, after measuring the BGS in the whole region, to other values only in a part of the region in the next BGS measurement and later. For example, the BGS may usually be measured successively in search domains allocated to the whole region of the object to be measured while setting the search domain length to about 10 m, and once a day in each of search domains allocated with a search domain length of about 0.5 m. In this case, the location control section 12 and domain control section 13 set a pattern of search domain location and search domain length for each time zone, and order such as to measure the BGS of each search domain in accordance with thus set pattern (automatically change the length of a specific search domain after the lapse of a predetermined time).

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

INDUSTRIAL APPLICABILITY

The optical fiber distribution type sensor according to the present invention can be employed in temperature measurement/detection systems utilizing a gain fluctuation by Brillouin scattering occurring in an optical fiber set in a predetermined environment.

The invention claimed is:

1. An optical fiber distribution type detecting method of measuring Brillouin scattered light outputted from an optical fiber at least partly placed in an object, so as to detect an amount of physical change at a specific location of the object, said method comprising:

a control step of allocating at least one search domain as a detecting subject to at least part of a region to be measured in the optical fiber placed in the object before supplying the optical fiber with probe light and pumping light modulated with the same modulation frequency and modulation index in a state maintaining a predetermined phase difference therebetween, said control step including a domain control substep of determining a length of the search domain by regulating the modulation frequency and modulation index, and a location control substep of determining a location of the search domain by regulating the phase difference between the probe light and pumping light;

a measurement step of receiving, as output light from the search domain specified as the detecting subject by said control step, the probe light having acquired a gain by Brillouin scattered light occurring as the probe light and pumping light propagate through the specified search domain, and measuring data related to a form of a Brillouin gain spectrum as a spectrum of the gain acquired by the received probe light; and a detection step of detecting a temperature change or strain change of the optical fiber in the specified search domain in accordance with the data related to the form of the Brillouin gain spectrum of the received probe light measured in said measurement step;

wherein said measurement step and detection step are carried out repeatedly at a fixed interval of time or every time at least one of incidents of changing the length of the search domain in said domain control substep and changing the location of the search domain in said location control substep occurs.

2. An optical fiber distribution type detecting method according to claim 1, wherein said location control substep determines a search domain location at a fixed interval of time or every time said measurement step and detection step concerning the specific search domain end.

3. An optical fiber distribution type detecting method according to claim 1, wherein said domain control substep determines a search domain length at a fixed interval of time or every time said measurement step and detection step concerning the specific search domain end.

4. An optical fiber distribution type detecting method according to claim 1, wherein said domain control substep changes the search domain length such that at least the search domain specified as the detecting subject is divided into a plurality of smaller search domains when an occurrence of a temperature change or strain change in the specified search domain is detected in said detection step.

5. An optical fiber distribution type detecting method according to claim 1, wherein said domain control substep sets, as an initial setting, a search domain length coinciding with the whole region to be measured in the optical fiber.

6. An optical fiber distribution type sensor for executing an optical fiber distribution type detecting method according to claim 1, said sensor comprising:
   a light source for outputting probe light and pumping light modulated with the same modulation frequency and modulation index in a state maintaining a predetermined phase difference therebetween;
   an optical fiber, at least partly placed in an object, for outputting Brillouin scattered light occurring as the probe light and pumping light outputted from said light source propagate;
   a spectrum measurement section for receiving the probe light having acquired a gain by the Brillouin scattered light, and measuring data related to a form of a Brillouin gain spectrum as a spectrum of the gain acquired by the received probe light;
   a detection section for detecting, in accordance with the data related to the form of the Brillouin gain spectrum measured by said spectrum measurement section, an occurrence of a temperature change or strain change in a search domain generating the Brillouin scattered light; and
   a control section for controlling and driving said light source such as to allocate at least one search domain as a detecting subject to at least part of a region to be measured in said optical fiber placed in the object before supplying said optical fiber with the probe light and pumping light.

7. An optical fiber distribution type sensor according to claim 6, wherein said control section includes a domain control section for determining a search domain length by regulating the modulation frequency and modulation index, and a location control section for determining a search domain location by regulating the phase difference between the probe light and pumping light.

* * * * *